United States Patent [19]

Yamauchi et al.

[11] 4,231,877

[45] Nov. 4, 1980

[54] BLOOD DIALYZER

[75] Inventors: Kazuhisa Yamauchi; Taku Tanaka; Syuji Kawai; Hirokuni Tanii, all of Kurashiki, Japan

[73] Assignee: Kuraray Co., Ltd., Kurashiki, Japan

[21] Appl. No.: 910,462

[22] Filed: May 30, 1978

[30] Foreign Application Priority Data

Jun. 1, 1977 [JP] Japan .............................. 52-71838[U]

[51] Int. Cl.³ .............................................. B01D 31/00
[52] U.S. Cl. ............................. 210/321 B; 210/433 M; 210/500 M
[58] Field of Search ............... 210/247, 321 R, 321 A, 210/321 B, 433 M, 23 R, 500 M; 128/214 R; 526/8

[56] References Cited

U.S. PATENT DOCUMENTS 3,888,771  6/1975  Isuge et al. ...................... 210/500 M
4,031,012  6/1977  Gics ............................. 210/321 B X

FOREIGN PATENT DOCUMENTS 2625681  3/1977  Fed. Rep. of Germany ...... 210/500 M
2721008  12/1977  Fed. Rep. of Germany .

OTHER PUBLICATIONS

The Capillary Membrane Blood Oxygenator–vol. XIV, Trans. Amer. Soc. Art if. Int. Organs, 1968. pp. 236-241, de Filippi et al.
Optimal Design of Hollow Fiber Modules; Doshi et al., AICHE Jnl., vol. 23, #5, pp. 765-768.

Primary Examiner—Ferris H. Lander
Attorney, Agent, or Firm—Barry Kramer

[57] ABSTRACT

The invention relates to a blood dialyzing apparatus comprising at least one bundle of semi-permeable hollow filaments and a cylindrical housing positioning said bundle of filaments and having a large length to inside diameter ratio of 7 to 10.

4 Claims, 1 Drawing Figure

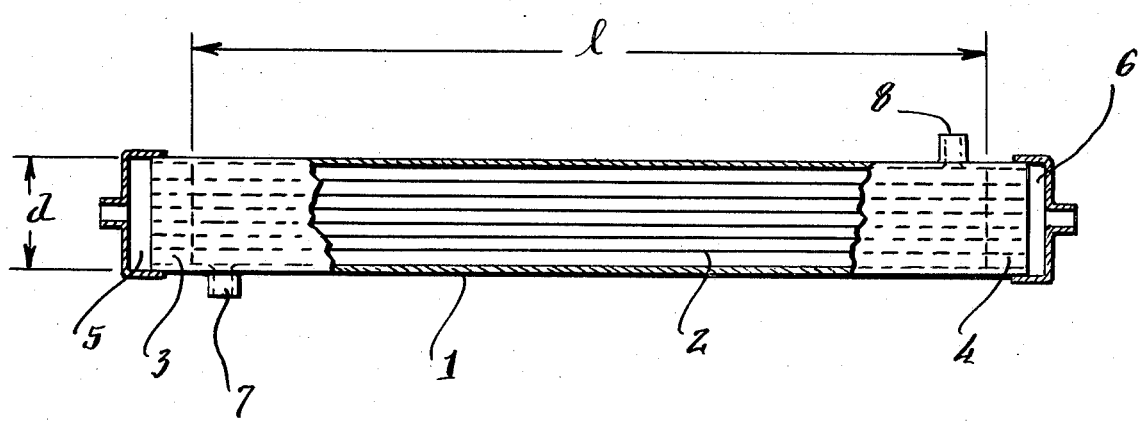

BLOOD DIALYZER

BACKGROUND OF THE INVENTION

1. Field of the Invention

This invention relates to an improvement in the blood dialyzing apparatus and, more particularly, to a blood dialyzing apparatus comprising at least one bundle of semi-permeable hollow filaments and a cylindrical housing positioning said bundle of filaments and having a large length to inside diameter ratio.

2. Description of the Prior Art

Blood dialyzers employing hollow filaments are well known as artificial kidneys and have been available in a number of configurations and constructions. These dialyzers may be generally classified into those employing a cylindrical housing and those employing an oblong housing. The dialyzer using a cylindrical housing can be manufactured more easily and a large majority of blood dialyzers available today are of this type.

In designing a cylindrical blood dialyzer, its structural parameters such as the ratio of length to inside diameter have heretofore been selected with emphasis on the relationship of blood and dialysate flows. Thus, to prevent clotting and hemolysis, the blood is desirably treated under as mild conditions as possible. Thus, excessively highly flow rates and high pressures of blood have to be avoided and it has, therefore, been thought that the cross-sectional area of the hollow filaments' lumens is preferably large. Thus, the conventional cylindrical blood dialyzer includes a large number of hollow filaments and its housing has a comparatively large diameter with respect to its length. Thus, the ratio of length to inside diameter of the housing is within about 3 to 5.5.

SUMMARY OF THE INVENTION

The present invention provides a novel blood dialyzing apparatus wherein at least one bundle of semi-permeable hollow filaments are contained in a cylindrical housing, characterized in that the ratio (l/d) of the effective length l to the inside diameter d of said cylindrical housing is within the range between 7 and 10.

BRIEF DESCRIPTION OF THE DRAWING

FIG. 1 is a sectional schematic view of blood dialyzing apparatus according to this invention.

DETAILED DESCRIPTION OF THE INVENTION

The hollow filaments employable according to this invention may be any semi-permeable hollow filaments membrane that is useful for the purpose of blood dialysis. Thus, it may for example be made of regenerated cellulose, especially regenerated cellulose from cuprammonium cellulose, cellulose ester, PVA, ethylene-vinyl alcohol copolymer, polyacrylonitrile or polymethyl methacrylate. The outer diameter of such hollow filaments may range from 200 to 2000$\mu$ and, preferably, from 250 to 1200$\mu$, and the wall thickness of the fiber may range from 10 to 300$\mu$ and, preferably, from about 10 to 100$\mu$.

About 3000 to more than 10,000 hollow filaments are made up into a single bundle or a plurality of bundles, which are then positioned in a cylindrical housing. Adjacent each of its ends, the bundle is secured in position with respect to the housing by means of a sealing agent such as a polyurethane, epoxy, silicone or other resin materials. It is so arranged that the open ends of the hollow filaments on the outer surface of the sealing agent communicate with the blood inlet and outlet, respectively, of the apparatus.

The performance of a blood dialyzing apparatus is normally tested in a blood model, i.e., by employing a liquid containing certain metabolites normally found in the blood and/or substitutes therefor.

To perform a comparative performance test, several dialyzers were built using hollow filaments of ethylene-vinyl alcohol copolymer, varying the length to inside diameter ratio (l/d) of the housing. Thus, the total membrane area was kept constant at 1.1 m$^2$ for all the dialyzers and the dialysances of urea, creatinine and vitamin B$_{12}$ were determined at the blood flow rate of 200 ml/min. and the dialysate flow rate of 500 ml/min. The results are set forth in Table 1.

TABLE 1

| Test No. | Length/inside diam. (mm)/(mm) | l/d ratio | Dialysance, ml/min. | | |
|---|---|---|---|---|---|
| | | | Urea | Creatinine | $vB_{12}$ |
| 1 | 155/52 | 3.0 | 61 | 39 | 17 |
| 2 | 195/44 | 4.4 | 70 | 53 | 29 |
| 3 | 235/39 | 6.0 | 91 | 61 | 28 |
| 4 | 275/39 | 7.1 | 105 | 74 | 33 |
| 5 | 275/36 | 7.6 | 107 | 79 | 35 |
| 6 | 275/34 | 8.1 | 105 | 88 | 35 |
| 7 | 275/31 | 8.9 | 108 | 89 | 36 |
| 8 | 295/29.5 | 10.0 | 114 | 92 | 38 |
| 9 | 295/27 | 10.9 | 113 | 93 | 38 |

It will be apparent that with the apparatus having l/d ratios in excess of 7, marked improvements were obtained in the dialysances of urea and creatinine which are low molecular weight substances, as well as in the dialysance of vitamin B$_{12}$ which has a middle molecular weight. When, however, the l/d ratio was increased beyond 10, no significant improvement in dialysance could be obtained but, rather, the considerable pressure drop of the blood suggested the likelihood of hemolysis and clotting. Moreover, the increased pressure led to a high ultrafiltration rate, thus causing difficulty in ultrafiltration control. In fact, it is surprising that a dialyzer having a high l/d ratio of 7 to 10 according to this invention produces dialysances more than 30 percent greater, without any defect on the blood, than a conventional dialyzer with a lower l/d ratio.

The apparatus according to this invention preferably has an inside diameter (d) of about 20 to 50 mm and an effective length (l) of about 200 to 350 mm, whereby the l/d ratio is within 7 to 10 as aforesaid. The term "effective length" as used herein means the length of a cylindrical housing positioning the bundle of hollow filaments except the portions thereof covered by the sealing agent and any projections forming manifolds, and the like. The term "inside diameter" means the diameter of the inner cavity of the cylindrical housing in which said bundle of hollow filaments are contained.

The cylindrical housing is made of any of polymer materials and has a cylindrical configuration. It may be provided with baffles and bulges extending either inwardly or outwardly to control the flow of dialysate or for other purposes.

Because apparatus according to this invention has a considerably slim configuration as compared with the conventional apparatus, it has several advantages in addition to those mentioned hereinbefore. Thus, it requires a lesser amount of sealing agent and permits the hollow filament bundle to be more readily trimmed at the ends.

Referring to FIG. 1 which illustrates an embodiment of this invention, a cylindrical housing 1 contains a bundle of hollow filaments 2 having ends 3 and 4 which are secured in position with respect to the housing by means of a sealing agent. The ends of the hollow-filament bundle 2 are connected to a blood inlet 5 and a blood outlet 6, respectively. The cylindrical housing 1 is further provided with a dialysate inlet 7 and a dialysate outlet 8 adjacent its ends.

The following example shows the advantages of a blood dialyzing apparatus according to this invention.

EXAMPLE

Dry hollow filaments of ethylene-vinyl alcohol copolymer (the inside and outside diameters of each filament are $400\mu$ and $500\mu$, respectively) were positioned into three cylindrical housings with a varying l/d ratio in such a manner that the total membrane area was invariably 1.4 m$^2$, to assemble 3 different blood dialyzing units. The dialyzing performances (dialysances) of these dialyzing units were measured at a blood flow rate of 200 ml/min. and a dialysate flow rate of 500 ml/min. The results are set forth in Table 2.

TABLE 2

| Test No. | Cylindrical housing l(mm/in. diam.(mm) | l/d ratio | No. of hollow filaments | Dialysance (ml/min.) | | |
|---|---|---|---|---|---|---|
| | | | | Urea | Creatinine | $\nu B_{12}$ |
| I | 235/39 | 6.0 | 3793 | 116 | 78 | 35 |
| II | 275/36 | 7.6 | 3241 | 150 | 115 | 49 |
| III | 295/25 | 11.8 | 3021 | 144 | 113 | 47 |

It will be apparent from Table 2 that the blood dialyzing unit of Test No. II is particularly suited for use as an artificial kidney in view of the dialysances of urea, creatinine and vitamin $B_{12}$. The dialyzing unit of Test No. III was fairly satisfactory as far as dialysances are concerned. However, because of its excessively high l/d ratio, the flow rate of blood in the hollow filaments seemed to be too high since residues of blood (apparently due to clotting) were observed. Thus, from an overall point of view, this dialyzer of Test No. III was unsatisfactory as an artificial kidney. The apparatus of Test No. I provides insufficient dialysances and, therefore, is unsatisfactory as an artificial kidney.

What is claimed is:

1. An improved blood dialyzing apparatus comprising the combination of a cylindrical housing and at least one bundle of semi-permeable hollow filaments positioned in said housing, a blood inlet and outlet in respective ends of said housing, and a dialysate inlet and outlet in the side wall of said housing, the improvement wherein:

said housing has an inside diameter in the range of 20 to 50 mm, and an effective length in the range of 200 to 350 mm, the ratio of the effective length of said housing to the inside diameter thereof being within the range of 7 to 10.

2. The improved blood dialyzing apparatus of claim 1, wherein each of said hollow filaments has an outside diameter in the range of 200–2000$\mu$ and, the wall thickness of each of said filaments is in the range of 100 to 300$\mu$, said bundle consisting of at least 3000 of said hollow filaments.

3. A blood dialyzing apparatus as set forth in claim 2 wherein the hollow filament is made of ethylene-vinyl alcohol copolymer.

4. A blood dialyzing apparatus as set forth in claim 2 wherein the hollow filament is made of regenerated cellulose from cuprammonium cellulose.

* * * * *

UNITED STATES PATENT AND TRADEMARK OFFICE
CERTIFICATE OF CORRECTION

PATENT NO. : 4,231,877

DATED : November 4, 1980

INVENTOR(S) : K. Yamauchi et al

It is certified that error appears in the above—identified patent and that said Letters Patent is hereby corrected as shown below:

In Claim 2, line 4, "100" should read --10--.

Signed and Sealed this

Second Day of March 1982

[SEAL]

Attest:

GERALD J. MOSSINGHOFF

Attesting Officer     Commissioner of Patents and Trademarks